(12) United States Patent  
Foret

(10) Patent No.: US 8,833,054 B2  
(45) Date of Patent: *Sep. 16, 2014

(54) SYSTEM, METHOD AND APPARATUS FOR LEAN COMBUSTION WITH PLASMA FROM AN ELECTRICAL ARC

(75) Inventor: Todd Foret, Lafayette, LA (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 267 days.

This patent is subject to a terminal disclaimer.

(21) Appl. No.: 13/282,260

(22) Filed: Oct. 26, 2011

(65) Prior Publication Data

US 2012/0036829 A1 Feb. 16, 2012

Related U.S. Application Data

(63) Continuation of application No. 12/370,591, filed on Feb. 12, 2009, now Pat. No. 8,074,439.

(60) Provisional application No. 61/027,879, filed on Feb. 12, 2008.

(51) Int. Cl.  
*F03H 1/00* (2006.01)

(52) U.S. Cl.  
USPC ....... 60/203.1; 60/202; 60/39.281; 60/39.511

(58) Field of Classification Search  
USPC .............. 60/39.821, 39.826, 200.1, 772, 736, 60/39.511, 780  
See application file for complete search history.

(56) References Cited

U.S. PATENT DOCUMENTS

| 481,979 A | 9/1892 | Stanley |
| 501,732 A | 7/1893 | Roeske |
| 2,784,294 A | 3/1957 | Gravert |

(Continued)

FOREIGN PATENT DOCUMENTS

| JP | 2006501980 A | 1/2006 |
| KR | 101999009569 A | 2/1999 |
| KR | 2004-000510 A | 1/2004 |

OTHER PUBLICATIONS

Belani, A., "It's Time for an Industry Initiative on Heavy Oil," JPT Online accessed on Oct. 16, 2007 at http://www.spe.org/spe-app/spe/jpt/2006/06/mangement_heavy_oil.htm, 2 pages.

(Continued)

*Primary Examiner* — Craig Kim  
(74) *Attorney, Agent, or Firm* — Daniel J. Chalker; Chalker Flores, LLP

(57) ABSTRACT

The present invention provides a plasma arc torch that can be used for lean combustion. The plasma arc torch includes a cylindrical vessel, an electrode housing connected to the first end of the cylindrical vessel such that a first electrode is (a) aligned with a longitudinal axis of the cylindrical vessel, and (b) extends into the cylindrical vessel, a linear actuator connected to the first electrode to adjust a position of the first electrode, a hollow electrode nozzle connected to the second end of the cylindrical vessel such that the center line of the hollow electrode nozzle is aligned with the longitudinal axis of the cylindrical vessel, and wherein the tangential inlet and the tangential outlet create a vortex within the cylindrical vessel, and the first electrode and the hollow electrode nozzle create a plasma that discharges through the hollow electrode nozzle.

19 Claims, 7 Drawing Sheets

(56) References Cited

U.S. PATENT DOCUMENTS

| | | |
|---|---|---|
| 2,898,441 A | 8/1959 | Reed et al. |
| 2,923,809 A | 2/1960 | Clews et al. |
| 3,004,189 A | 10/1961 | Giannini |
| 3,082,314 A | 3/1963 | Arata et al. |
| 3,131,288 A | 4/1964 | Browning et al. |
| 3,242,305 A | 3/1966 | Kane et al. |
| 3,534,388 A | 10/1970 | Ito et al. |
| 3,567,898 A | 3/1971 | Fein |
| 3,619,549 A | 11/1971 | Hogan et al. |
| 3,641,308 A | 2/1972 | Couch, Jr. et al. |
| 3,787,247 A | 1/1974 | Couch, Jr. |
| 3,798,784 A | 3/1974 | Kovats et al. |
| 3,830,428 A | 8/1974 | Dyos |
| 3,833,787 A | 9/1974 | Couch, Jr. |
| 4,067,390 A | 1/1978 | Camacho et al. |
| 4,169,503 A | 10/1979 | Scott |
| 4,203,022 A | 5/1980 | Couch, Jr. et al. |
| 4,265,747 A | 5/1981 | Copa et al. |
| 4,311,897 A | 1/1982 | Yerushalmy |
| 4,344,839 A | 8/1982 | Pachkowski et al. |
| 4,463,245 A | 7/1984 | McNeil |
| 4,531,043 A | 7/1985 | Zverina et al. |
| 4,567,346 A | 1/1986 | Marhic |
| 4,624,765 A | 11/1986 | Cerkanowicz et al. |
| 4,776,638 A | 10/1988 | Hahn |
| 4,886,118 A | 12/1989 | Van Meurs et al. |
| 5,019,268 A | 5/1991 | Rogalla |
| 5,048,404 A | 9/1991 | Bushnell et al. |
| 5,082,054 A | 1/1992 | Kiamanesh |
| 5,166,950 A | 11/1992 | Jouvaud et al. |
| 5,326,530 A | 7/1994 | Bridges |
| 5,348,629 A | 9/1994 | Khudenko |
| 5,368,724 A | 11/1994 | Ayers et al. |
| 5,534,232 A | 7/1996 | Denes et al. |
| 5,609,736 A | 3/1997 | Yamamoto |
| 5,609,777 A | 3/1997 | Apunevich et al. |
| 5,655,210 A | 8/1997 | Gregoire et al. |
| 5,660,743 A | 8/1997 | Nemchinsky |
| 5,738,170 A | 4/1998 | Laverhne |
| 5,746,984 A | 5/1998 | Hoard |
| 5,766,447 A | 6/1998 | Creijghton |
| 5,876,663 A | 3/1999 | Laroussi |
| 5,879,555 A | 3/1999 | Khudenko |
| 5,893,979 A | 4/1999 | Held |
| 5,908,539 A | 6/1999 | Young et al. |
| 5,979,551 A | 11/1999 | Uban et al. |
| 6,007,681 A | 12/1999 | Kawamura et al. |
| 6,117,401 A | 9/2000 | Juvan |
| 6,228,266 B1 | 5/2001 | Shim |
| 6,749,759 B2 | 6/2004 | Denes et al. |
| 6,929,067 B2 | 8/2005 | Vinegar et al. |
| 6,987,792 B2 | 1/2006 | Do et al. |
| 7,086,468 B2 | 8/2006 | De Rouffignac et al. |
| 7,096,953 B2 | 8/2006 | De Rouffignac et al. |
| 7,121,342 B2 | 10/2006 | Vinegar et al. |
| 7,128,816 B2 | 10/2006 | Denes et al. |
| 7,536,975 B2 | 5/2009 | Denes et al. |
| 7,857,972 B2 | 12/2010 | Foret |
| 7,893,408 B2 | 2/2011 | Hieftje et al. |
| 8,074,439 B2 * | 12/2011 | Foret ......................... 60/203.1 |
| 2002/0148562 A1 | 10/2002 | Aoyagi et al. |
| 2003/0024806 A1 | 2/2003 | Foret |
| 2003/0101936 A1 | 6/2003 | Lee |
| 2003/0179536 A1 | 9/2003 | Stevenson et al. |
| 2003/0213604 A1 | 11/2003 | Stevenson et al. |
| 2005/0087435 A1 | 4/2005 | Kong et al. |
| 2005/0151455 A1 | 7/2005 | Sato et al. |
| 2005/0155373 A1 | 7/2005 | Hirooka et al. |
| 2006/0151445 A1 | 7/2006 | Schneider |
| 2006/0196424 A1 | 9/2006 | Swallow et al. |
| 2007/0240975 A1 | 10/2007 | Foret |
| 2007/0253874 A1 | 11/2007 | Foret |
| 2008/0202915 A1 | 8/2008 | Hieftje et al. |
| 2011/0031224 A1 | 2/2011 | Severance, Jr. et al. |
| 2012/0097648 A1 | 4/2012 | Foret |

OTHER PUBLICATIONS

Brandt, A. R., "Converting Green River oil shale to liquid fuels with Alberta Taciuk Processor: energy inputs and greenhouse gas emissions," Jun. 1, 2007, 33 pages.

Brandt, A. R., "Converting Green River oil shale to liquid fuels with the Shell in-situ conversion process: energy inputs and greenhouse gas emissions," Jun. 30, 2007, 36 pages.

International Search Report and Written Opinion for PCT/US2009/000937 dated Sep. 17, 2009, 11 pages.

International Search Report and Written Opinion for PCT/US2008/011926 dated Apr. 17, 2009, 10 pages.

Kavan, L., "Electrochemical Carbon," Chem Rev (1997), 97:3061-3082.

"Understanding in-situ combustion," www.HeavyOilinfo.com, accessed Oct. 16, 2007, 4 pages.

"Unleashing the potential: Heavy Oil," Supplement to E&P Annual Reference Guide, www.eandp.info.com, Jun. 2007, 15 pages.

International Search Report [KIPO] PCT/US201/062941 dated Jan. 27, 2014.

* cited by examiner

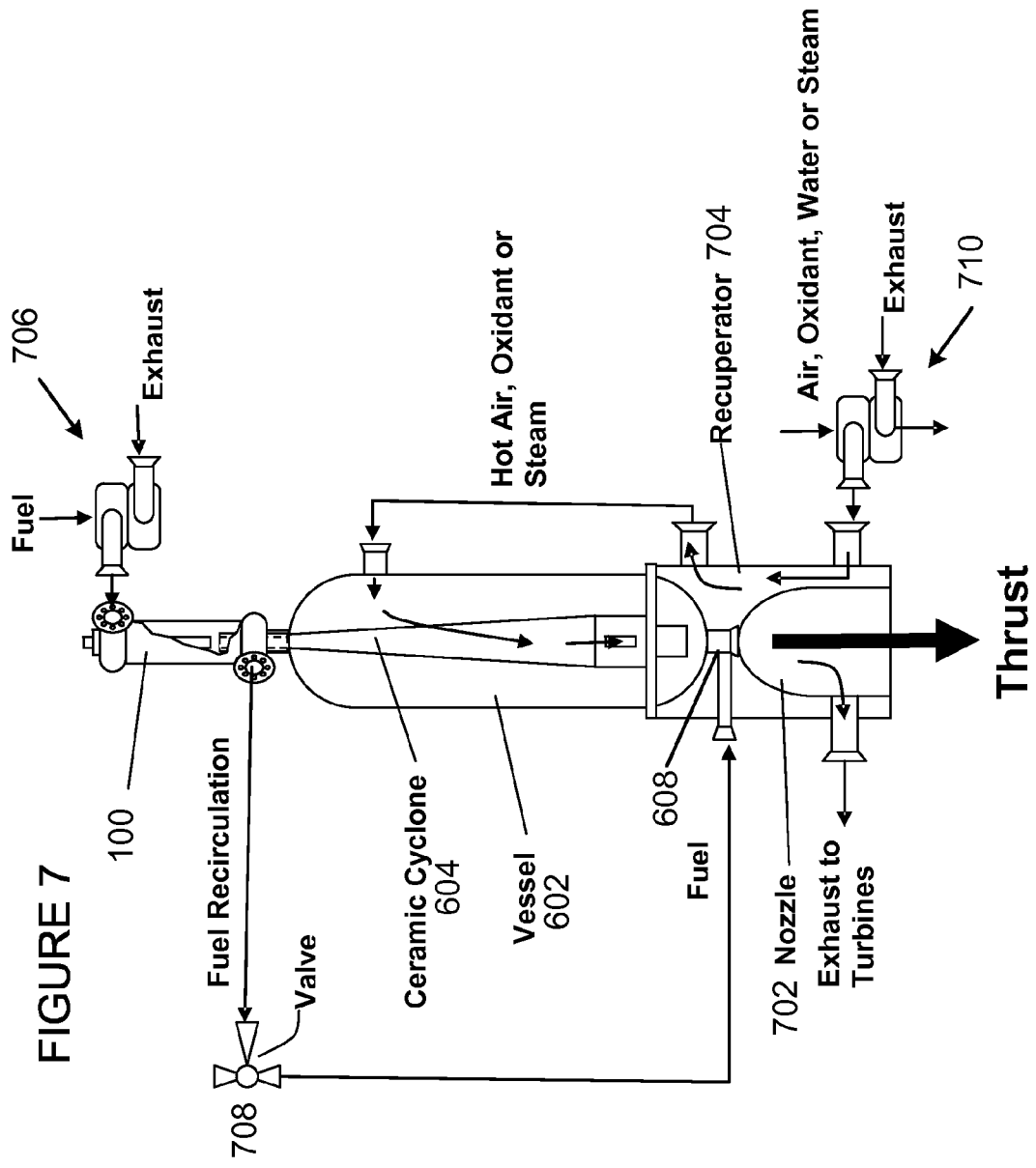

SYSTEM, METHOD AND APPARATUS FOR LEAN COMBUSTION WITH PLASMA FROM AN ELECTRICAL ARC

PRIORITY CLAIM

This patent application is a continuation patent application of U.S. patent application Ser. No. 12/370,591 filed on Feb. 12, 2009 and entitled "System, Method and Apparatus for Lean Combustion with Plasma from an Electrical Arc," which is a non-provisional patent application of U.S. provisional patent application Ser. No. 61/027,879 filed on Feb. 12, 2008 and entitled, "System, Method and Apparatus for Lean Combustion with Plasma from an Electrical Arc," both of which are hereby incorporated by reference in their entirety.

FIELD OF THE INVENTION

The present invention relates generally to gas turbine engines. More specifically, the present invention relates to a supersonic lean combustion plasma steam reforming turbine engine that will combust low BTU gas such as landfill gas, biogas, blast furnace gas, coke oven gas and syngas.

BACKGROUND OF THE INVENTION

There are many problems associated with lean fuel combustion or low BTU gas combustion in gas turbine engines. With the successful flight of the X-43A, hypersonic flight has achieved several technological goals and entered a new era. With further developments, it will reach Technology Readiness Level. However, FAA and EPA emission regulations in addition to the cost of fossil-based aviation fuels have pushed the aviation community into research and development for highly efficient aircraft engines that work on alternative and/or renewable fuels. In particular, the land based gas turbine community has been conducting research for integrating coal gasification with a combined cycle turbine ("IGCC"). In any case, the combustion of the product from gasification of carbon containing matter—synthesis gas ("syngas")—requires major modifications to current gas turbine engines. Because syngas has a low heating value ("LHV") compared to natural gas, significantly more fuel must be injected in an IGCC turbine than a natural gas turbine. Therefore, the mass-flow—and thus the output power—of the gas turbine is much higher for an IGCC application. For the same reason, the gas turbine's output power is flat-rated to very high temperatures.

Supersonic Combustion and Flame Holding

Problem 1: Gas Turbine to Ramjet or Scramjet Operations

High Bypass Fan Gas Turbines are the primary engines for transportation aircraft. Typical speeds are 893 km/h (482 kt) at altitude on aircraft such as the Boeing 777-300. Military aircraft use augmentors ("afterburners") to achieve and sustain supersonic flight. Only the new F-22 raptor can sustain supersonic flight without the use of an augmentor. Air breathing ramjets or scramjets are required to achieve hypersonic flight using air. However, only one successful Scramjet has been flown since the beginning of aviation. The major problem with ramjets and scramjets can be traced back to the early problem of flame holding or preventing engine flame out. In addition, no matter which configuration is chosen for Hypersonic Flight a problem remains—transition from subsonic to supersonic and finally hypersonic flight will require several different engines.

Problem 2: Lean Combustion or Low BTU Fuel Combustion

Fuel-lean combustion can increase efficiency while lowering emissions. However, current combustors cannot hold a flame during lean combustion conditions. Likewise, low BTU fuel such as syngas is difficult to combust in current gas turbine engines.

Ansaldo Energia (Genoa, Italy) has engineered a new gas turbine V94.2K2 that targets the low-Btu (3.5 MJ/Kg-7 MJ/Kg LHV) market. The K2 gas turbine builds on the design philosophy of Ansaldo Energia's V94.2K that can handle fuels with 8 MJ/Kg-13 MJ/Kg LHV. The K2 is intended for Chinese and Eastern European markets where the company sees a demand for power generation from industrial gases, such as Blast Furnace Gas (BFG) and Coke Oven Gas (COG).

The Lower Explosive Limit (LEL) and Upper Explosive Limit (UEL) for common hydrocarbon based fuels, such as diesel (0.6% to 7.5%), gasoline (1.4% to 7.6%), and natural gas (Methane—5.0% to 15%) is fairly limited in range. On the other hand, syngas a product of natural gas (methane) steam reforming or gasification of hydrocarbons, coal, biomass, etc. is composed of hydrogen and carbon monoxide. The LEL and UEL for hydrogen (4% to 75%) and carbon monoxide (12.5% to 74.0%) are much broader than the parent fuel such as methane. Thus, this allows syngas (hydrogen +carbon monoxide) to be burned in a lean mode. The problem with syngas is that it is not widely available. It must be generated onsite by steam reforming natural gas or gasification of carbonaceous matter such as hydrocarbons or biomass. Typical gasifiers are very large and extremely expensive. However, a small and inexpensive plasma gasifier, such as the ArcWhirl®, U.S. Pat. No. 7,422,695 issued on Sep. 9, 2008 to the present inventor coupled to an IC engine could achieve both lean burn and supersonic combustion by gasifying the fuel first then combusting it in a cyclone combustor that is driven by a turbocharger.

Problem 3: Match lit in Hurricane

Supersonic combustion has been compared to keeping a match lit in a hurricane or tornado. All gas turbines slow the flow of compressed air to below supersonic velocities in order to maintain a flame. This is due to the inherit design of the flame-holding capabilities of the combustor for a given turbine.

Move Match to Eye of Hurricane

It is well known that speeds within a cyclone can easily attain supersonic velocities. For example, turbochargers and centrifugal compressors easily attain speeds of over 100,000 RPM. Likewise, the air circulating within a turbocharger would far exceed supersonic speeds. Thus, the present invention achieves supersonic combustion by utilizing the centripetal forces within a rotating air column, such as a cyclone or hurricane for energy transfer, while utilizing the void, commonly referred to as the eye or vortex, in order to keep the match lit in order to maintain ignition. Simply put, the match is moved from the whirling column of air known as the shear wall to the eye or center of the hurricane.

Problem 4: Flame is Stretched Due to Whirl Flow & Melts Turbine

Placing the igniter within the center of the combustor is common for many types of gas turbine engines. Allison's C-18 to C-20 series of gas turbine engines utilize a front mounted axial flow compressor that sweeps the compressed air to the combustor via externally mounted air conduits. If the combustor were redesigned such that the air tubes entered tangentially to the combustor housing, thus creating centrifugal flow within the redesigned cyclone or vortex combustor, then the igniter and fuel nozzle would be placed within the central void space or eye of a whirling mass of air. However, this would create a detrimental effect on the compressor turbine if operated at supersonic combustion utilizing an intense igniter such as a plasma torch. The intense heat within the centrally stretched out plasma flame would melt the center of the compressor turbine.

Problem 5: Flame Out

It is well known that lean combustion can achieve high efficiency while producing low emissions. However, attempting to achieve lean combustion within current internal combustion ("IC") engine designs may lead to low reaction rates, flame extinction ("Flame Out"), instabilities, and mild heat release. Likewise, many IC engines are very sensitivity to fuel/air mixing.

With the current push for sequestering carbon or utilizing renewable fuels, a need exists for a relatively inexpensive turbine engine design that can operate in a lean fuel combustion mode in addition to a supersonic combustion mode. If such a turbine could be easily coupled to a motor generator, high bypass fan or propeller, this would allow for rapid transition to renewable fuels for electrical generation, aviation, marine propulsion and thermal oxidation. The ability to transition from subsonic to supersonic then to hypersonic flight with the same engine would solve many problems with reaching space at an affordable payload rate. The ability to use the same air breathing supersonic combustion turbine as a steam plasma thruster in space solves the issues of carrying a large oxidizer payload.

SUMMARY OF THE INVENTION

The present invention provides a supersonic lean fuel combustion plasma arc turbine that includes a plasma arc torch, a cyclone combustor and a turbocharger. The plasma arc torch includes a cylindrical vessel having a first end and a second end, a tangential inlet connected to or proximate to the first end, a tangential outlet connected to or proximate to the second end, an electrode housing connected to the first end of the cylindrical vessel such that a first electrode is (a) aligned with a longitudinal axis of the cylindrical vessel, and (b) extends into the cylindrical vessel, a hollow electrode nozzle connected to the second end of the cylindrical vessel such that the center line of the hollow electrode nozzle is aligned with the longitudinal axis of the cylindrical vessel, and wherein the tangential inlet and the tangential outlet create a vortex within the cylindrical vessel, and the first electrode and the hollow electrode nozzle create a plasma that discharges through the hollow electrode nozzle. The cyclone combustor is connected to a hollow electrode nozzle of the plasma arc torch. The cyclone combustor has a tangential entry, a tangential exit, and an exhaust outlet. The turbocharger has a turbine connected to a compressor via a shaft. The turbine entry is connected to the tangential exit of the cyclone combustor, and a compressor exit is connected to the tangential entry of the cyclone combustor.

In addition, the present invention provides a plasma turbine thermal oxidizer that includes a plasma arc torch, a vessel housing at least one ceramic cyclone combustor, a first turbocharger and a second turbocharger. The plasma arc torch includes a cylindrical vessel having a first end and a second end, a tangential inlet connected to or proximate to the first end, a tangential outlet connected to or proximate to the second end, an electrode housing connected to the first end of the cylindrical vessel such that a first electrode is (a) aligned with a longitudinal axis of the cylindrical vessel, and (b) extends into the cylindrical vessel, a hollow electrode nozzle connected to the second end of the cylindrical vessel such that the center line of the hollow electrode nozzle is aligned with the longitudinal axis of the cylindrical vessel, and wherein the tangential inlet and the tangential outlet create a vortex within the cylindrical vessel, and the first electrode and the hollow electrode nozzle create a plasma that discharges through the hollow electrode nozzle. The vessel has an air intake, a discharge exhaust and houses at least one ceramic cyclone combustor connected to the hollow electrode nozzle. A first turbocharger has a first turbine entry, a first turbine exit, a first compressor entry and a first compressor exit, wherein the first turbine entry is connected to the discharge exhaust of the vessel and the compressor exit is attached to the tangential input of the plasma arc torch. A second turbocharger has a second turbine entry, a second turbine exit, a second compressor entry and a second compressor exit, wherein the second turbine entry is connected to the discharge exhaust of the vessel and the second compressor exit connected to an air intake of the vessel housing the ceramic cyclone combustor(s).

The present invention also provides a plasma turbine air breathing and steam rocket that includes a plasma arc torch, a vessel housing at least one ceramic cyclone combustor, a recuperator encapsulating an exhaust nozzle connected to a discharge exhaust to the vessel housing the ceramic cyclone combustor(s), a first turbocompressor for compressing air, oxidant, or steam connected to the recuperator, a second turbocompressor for pressuring fuel connected to the tangential input of the plasma arc torch, a valve system and a secondary oxidant injection system. The plasma arc torch includes a cylindrical vessel having a first end and a second end, a tangential inlet connected to or proximate to the first end, a tangential outlet connected to or proximate to the second end, an electrode housing connected to the first end of the cylindrical vessel such that a first electrode is (a) aligned with a longitudinal axis of the cylindrical vessel, and (b) extends into the cylindrical vessel, a hollow electrode nozzle connected to the second end of the cylindrical vessel such that the center line of the hollow electrode nozzle is aligned with the longitudinal axis of the cylindrical vessel, and wherein the tangential inlet and the tangential outlet create a vortex within the cylindrical vessel, and the first electrode and the hollow electrode nozzle create a plasma that discharges through the hollow electrode nozzle. The vessel houses at least one ceramic cyclone combustor is connected to the hollow electrode nozzle. The valve system connects the tangential output of the plasma arc torch to the recuperator that converts the first turbocompressor into a vapor compressor pulling a suction on the recuperator while a water pump injects water into the recuperator and the compressed steam cools the ceramic cyclone combustor and enters into the cyclone and shifts the syngas to hydrogen and carbon dioxide while injecting a secondary oxidant into the nozzle, thus allowing the rocket to transition from air breathing to steam propulsion. The ceramic cyclone combustor is cooled with a preheated combustion air from the first turbocompressor which cooled the exhaust nozzle in the recuperator, an exhaust is scavenged to drive the first and second turbocompressors and a valve system means.

Moreover, the present invention provides a method for supersonic lean fuel combustion by creating an electric arc, generating a whirl flow to confine a plasma from the electric arc, generating a combustion air whirl flow, extracting a rotational energy from one or more hot gases, recuperating energy from the hot gases, and utilizing the electrical arc for converting fuel to syngas while confining the plasma to the vortex of the whirling combustion air in order to maintain and hold a flame for supersonic combustion while coupled to a means for extracting rotational energy from the hot lean combustion exhaust gas while recuperating energy for preheating the fuel and combustion air.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 7 is a diagram of a Plasma Turbine Air Breathing & Steam Rocket with Recuperator in accordance with another embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
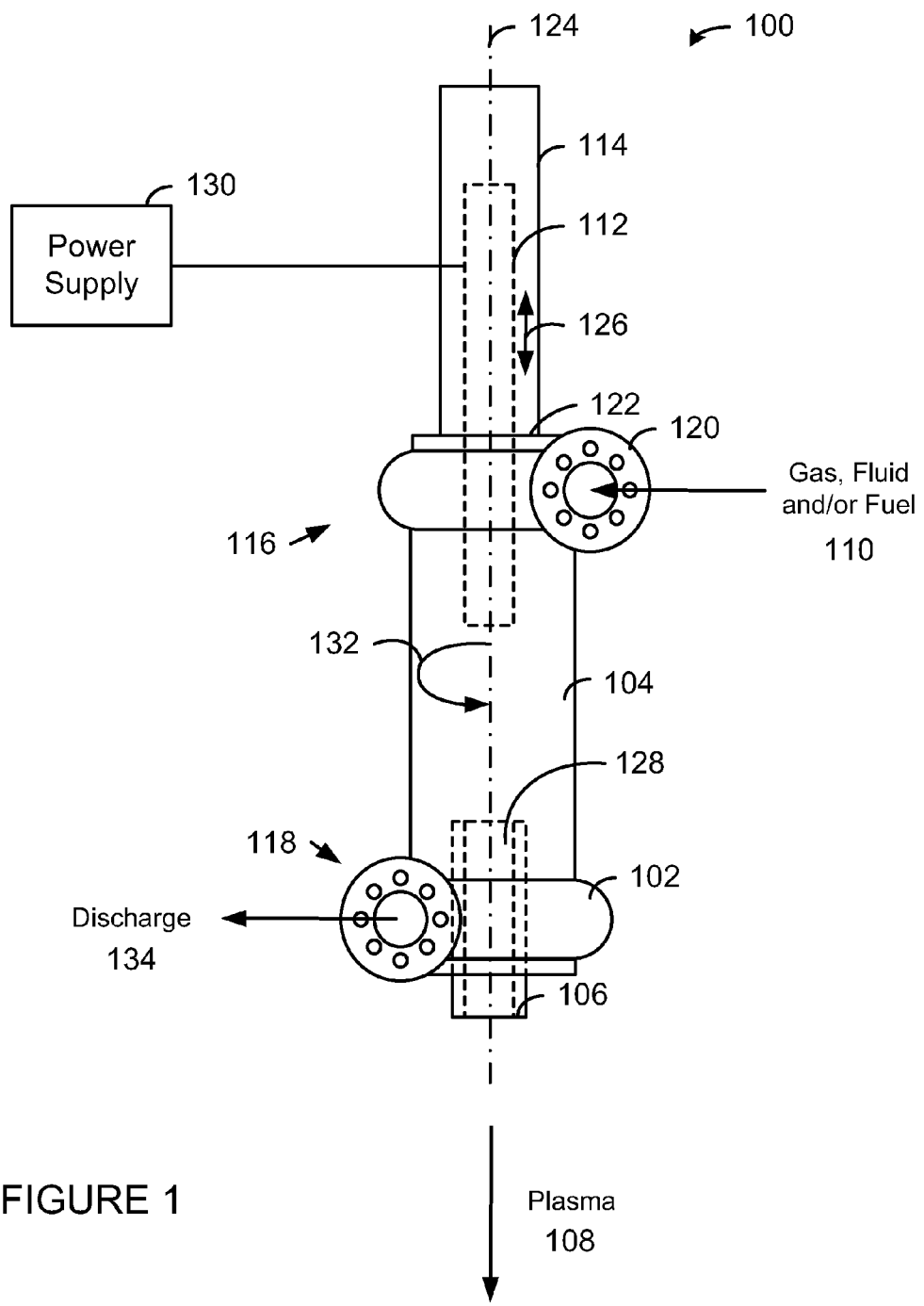
FIG. 1 is a diagram of a plasma arc torch in accordance with one embodiment of the present invention.

Now referring to FIG. 1, a plasma arc torch 100 in accordance with one embodiment of the present invention is shown. The plasma arc torch 100 is a modified version of the ARCWHIRL® device disclosed in U.S. Pat. No. 7,422,695 (which is hereby incorporated by reference in its entirety) that produces unexpected results. More specifically, by attaching a discharge volute 102 to the bottom of the vessel 104, closing off the vortex finder, replacing the bottom electrode with a hollow electrode nozzle 106, an electrical arc can be maintained while discharging plasma 108 through the hollow electrode nozzle 106 regardless of how much gas (e.g., air), fluid (e.g., water) or steam 110 is injected into plasma arc torch 100. In addition, when a valve (not shown) is connected to the discharge volute 102, the mass flow of plasma 108 discharged from the hollow electrode nozzle 106 can be controlled by throttling the valve (not shown) while adjusting the position of the first electrode 112 using the linear actuator 114.

As a result, plasma arc torch 100 includes a cylindrical vessel 104 having a first end 116 and a second end 118. A tangential inlet 120 is connected to or proximate to the first end 116 and a tangential outlet 102 (discharge volute) is connected to or proximate to the second end 118. An electrode housing 122 is connected to the first end 116 of the cylindrical vessel 104 such that a first electrode 112 is aligned with the longitudinal axis 124 of the cylindrical vessel 104, extends into the cylindrical vessel 104, and can be moved along the longitudinal axis 124. Moreover, a linear actuator 114 is connected to the first electrode 112 to adjust the position of the first electrode 112 within the cylindrical vessel 104 along the longitudinal axis of the cylindrical vessel 124 as indicated by arrows 126. The hollow electrode nozzle 106 is connected to the second end 118 of the cylindrical vessel 104 such that the center line of the hollow electrode nozzle 106 is aligned with the longitudinal axis 124 of the cylindrical vessel 104. The shape of the hollow portion 128 of the hollow electrode nozzle 106 can be cylindrical or conical. Moreover, the hollow electrode nozzle 106 can extend to the second end 118 of the cylindrical vessel 104 or extend into the cylindrical vessel 104 as shown. As shown in FIG. 1, the tangential inlet 120 is volute attached to the first end 116 of the cylindrical vessel 104, the tangential outlet 102 is a volute attached to the second end 118 of the cylindrical vessel 104, the electrode housing 122 is connected to the inlet volute 120, and the hollow electrode nozzle 106 (cylindrical configuration) is connected to the discharge volute 102. Note that the plasma arc torch 100 is not shown to scale.

A power supply 130 is electrically connected to the plasma arc torch 100 such that the first electrode 112 serves as the cathode and the hollow electrode nozzle 106 serves as the anode. The voltage, power and type of the power supply 130 is dependant upon the size, configuration and function of the plasma arc torch 100. A gas (e.g., air), fluid (e.g., water) or steam 110 is introduced into the tangential inlet 120 to form a vortex 132 within the cylindrical vessel 104 and exit through the tangential outlet 102 as discharge 134. The vortex 132 confines the plasma 108 within in the vessel 104 by the inertia (inertial confinement as opposed to magnetic confinement) caused by the angular momentum of the vortex, whirling, cyclonic or swirling flow of the gas (e.g., air), fluid (e.g., water) or steam 110 around the interior of the cylindrical vessel 104. During startup, the linear actuator 114 moves the first electrode 112 into contact with the hollow electrode nozzle 106 and then draws the first electrode 112 back to create an electrical arc which forms the plasma 108 that is discharged through the hollow electrode nozzle 106. During operation, the linear actuator 114 can adjust the position of the first electrode 112 to change the plasma 108 discharge or account for extended use of the first electrode 112.

Figure 2:
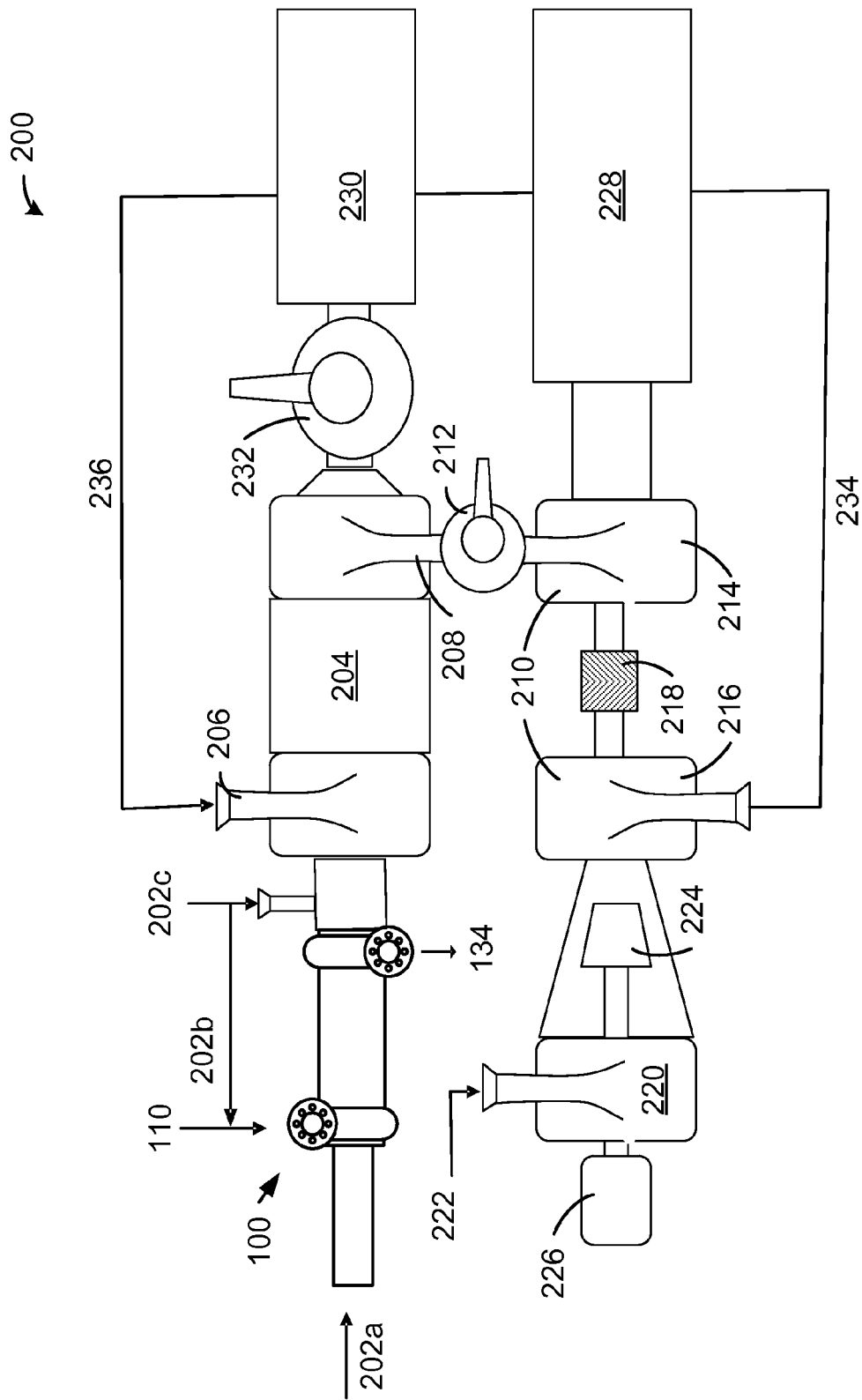
FIG. 2 is a diagram of a Supersonic Lean Combustion Plasma Turbine in accordance with one embodiment of the present invention.

Referring now to FIG. 2, a diagram of a Supersonic Lean Combustion Plasma Turbine 200 in accordance with one embodiment of the present invention is shown. In order to gasify, crack, reform or pyrolyize fuel, the fuel 202 may be introduced into the system at one or more points: (a) introducing the fuel 202a into the plasma 108 (FIG. 1) directly through first electrode 112 (FIG. 1) wherein the first electrode 112 (FIG. 1) is hollow; (b) mixing (e.g., via an eductor) the fuel 202b with the gas (e.g., air), fluid (e.g., water) or steam 110 introduced into the tangential inlet 120 (FIG. 1) of the plasma arc torch 100; and (c) introducing (e.g., via an eductor) the fuel 202c into the plasma 108 (FIG. 1) plume exiting the hollow electrode nozzle 106 (FIG. 1). The plasma arch torch 100 is connected to a cyclone combustor 204 with a tangential entry 206 and tangential exit 208. The cyclone combustor 204 is connected to a turbocharger 210 via valve 212. Hot gases enter into a turbine 214 of the turbocharger 210. The turbine 214 rotates a compressor 216 by means of a shaft with a pinion 218. A compressor inlet valve 220 is connected to the compressor 216. Compressor inlet valve 220 eliminates the need for stators to impart a whirl flow to match the compressor wheel rotation direction. In addition, by utilizing a tapered reducer for the housing the velocity of the air 222 must increase in order to conserve angular momentum. By utilizing a plunger style stopper valve assembly 224 coupled to a linear actuator 226, the mass flow can be pinched or reduced while maintaining velocity. The physical separation of the compressor/turbine or turbocharger 210 from the combustor 204 allows for a radically different design for gas turbines, power plants and airframes. The turbocharger 210 can be located and oriented to maximize airflow while minimizing foreign object damage (FOD). In addition, the turbocharger 210 may be coupled to rotating unions and tubing in order to rotate or direct the exhaust from the turbine 214 for thrust vectoring. In order to maximize efficiency a first stage recuperator 228 is placed on the discharge exhaust from the turbine 214 and a second stage recuperator 230 is place on the discharge exhaust from the combustor 204 via a valve 232. Compressed air 234 enters into the first stage recuperator 228 and then into the second stage recuperator 230. The hot compressed air 236 then enters into the combustor 204 via a volute with tangential entry 206.

More specifically, the compressor inlet valve 220 includes a volute with a tangential entry, a cone-shaped reducer connected to the volute, a linear actuator connected to the volute, and a cone-shaped stopper disposed within the cone-shaped reducer and operably connected to the linear actuator. A controller is connected to the linear actuator to adjust a gap between the cone-shaped stopper and the cone-shaped reducer to increase or decrease mass flow while maintaining whirl velocity to closely match compressor tip velocity.

Although there are several variations and modes of operations a few brief examples will be given in order to quickly demonstrate the uniqueness as well as functionality of the Supersonic Lean Combustion Plasma Turbine 200. A vortex is formed within the plasma arc torch 100 using water, steam, fuel or any other fluid 110. The arc is struck and a plasma is discharged into the eye of the cyclone combustor 204. The plasma syngas plume entering into the cyclone combustor 204 is also the igniter. Since it is in the eye of the cyclone it will be extended along the longitudinal axis of the combustor 204 and into valve 232. By throttling valves 212 and 232 the turbine can be operated from a takeoff mode and transition to supersonic and hypersonic flight. The purpose of the pinion 218 on the turbocharger 210 in combination with separating the combustor 204 from the compressor 216 and turbine 214 allows for a unique and completely unobvious mode of operation.

Figure 3:
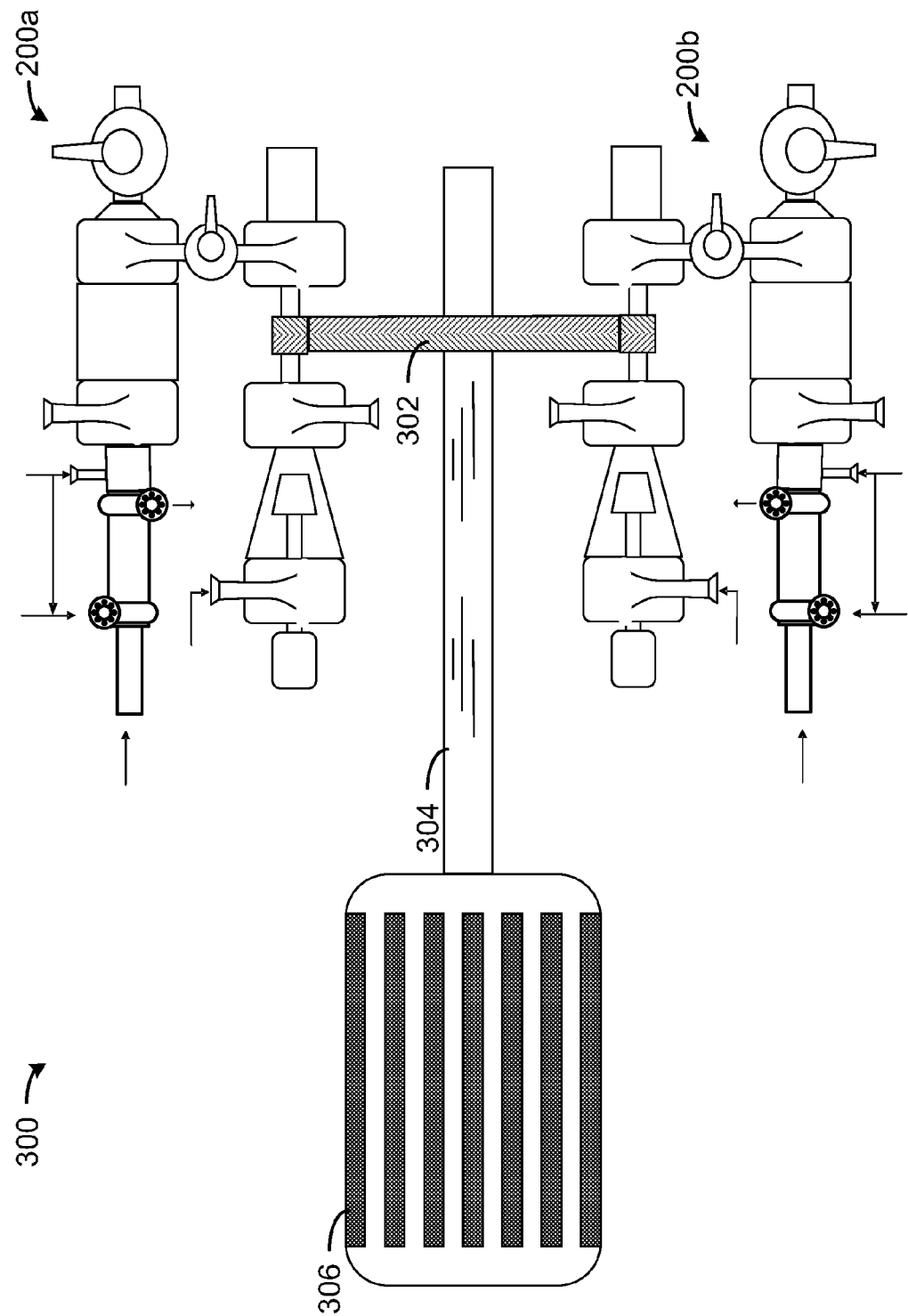
FIG. 3 is a diagram of a Supersonic Lean Combustion Plasma Turbine Motor Generator in accordance with another embodiment of the present invention.

Referring now to FIG. 3, a diagram of a Supersonic Lean Combustion Plasma Turbine Motor Generator 300 in accordance with another embodiment of the present invention is shown. Two or more Plasma Turbines 200 (200a and 200b as shown) are coupled to a bull gear 302 in a locked-train fashion. The bull gear 302 drives a motor generator 306 via drive shaft 304. This configuration allows for operating in a very fuel efficient and cost effective means. The first Plasma Turbine 200a is started by using the motor to rotate the pinions in order to rotate the compressor. The cyclone valve's stopper is opened to allow air into the compressor. The second Plasma Turbine's 200b stopper is placed in a closed position in order to unload the compressor. This can also be accomplished by placing electrical clutches on the pinion. When air flow enters into the combustor, the plasma arc torch 100 is ignited with only water or steam flowing through it in the same rotational direction as the cyclone combustor. Once the plasma arc is stabilized fuel is flowed into the plasma arc torch 100 and gasified and synthesized into hydrogen and carbon monoxide. The hot syngas plasma flows into the cyclone combustor. It is ignited and lean combusted and flowed out of the combustor via the tangential exit. Valve is fully opened while valve is shut in order to maximize flow into the turbine. Valves and are then adjusted according to torque loading on the pinion in addition to turbine and compressor speed.

By operating only one combustor at its maximum efficiency the generator can be operated as a spinning reserve. All utility companies within the US are required to maintain "Spinning Reserves." In order to come up to full power additional Plasma Turbines can be started almost instantly with very little lag time. This annular Plasma Turbine configuration may have multiple bull gears on a single shaft with each bull gear consisting of multiple Plasma Turbines.

Figure 4:
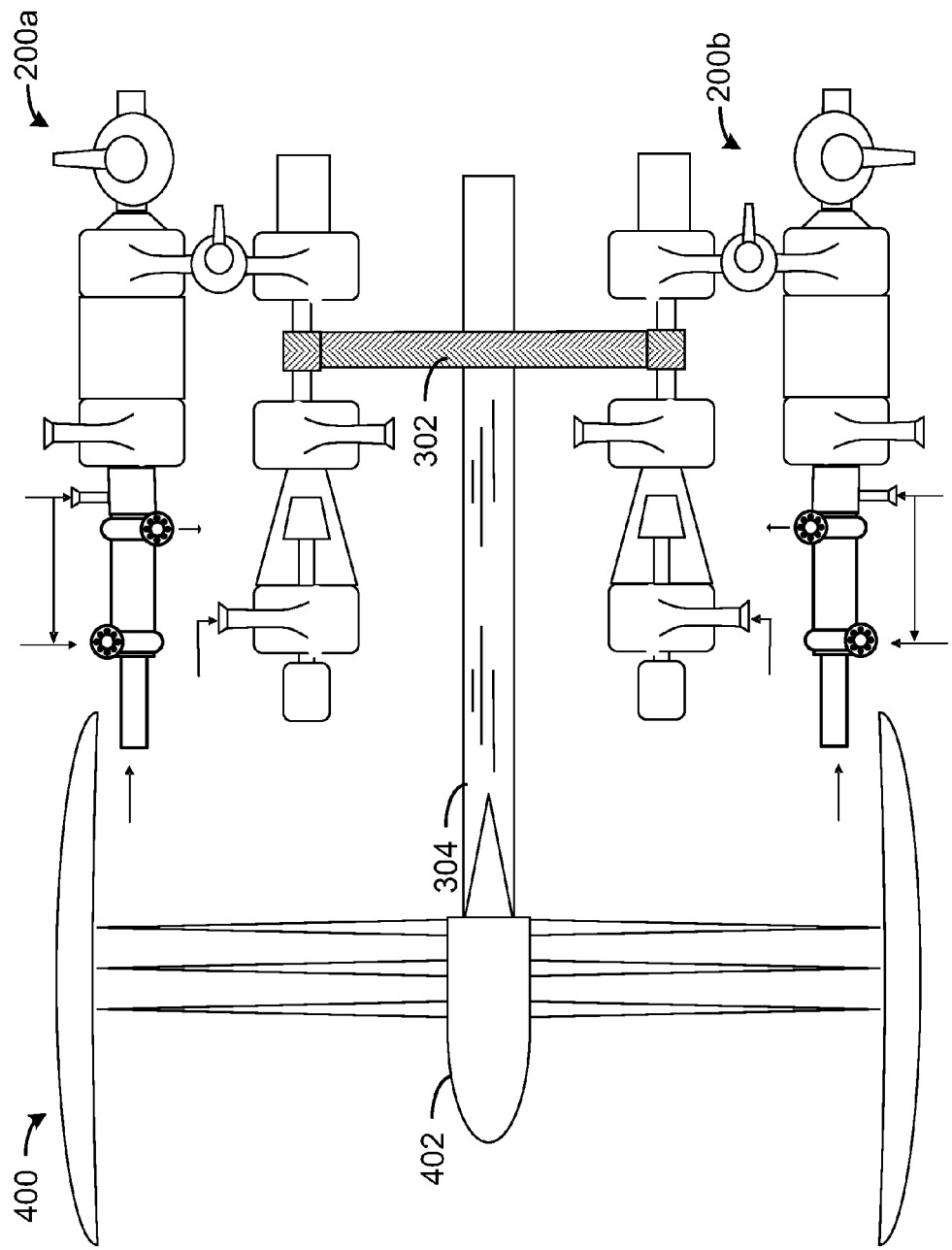
FIG. 4 is a diagram of a Supersonic Lean Combustion Plasma Turbine High Bypass Fan in accordance with another embodiment of the present invention.

Now referring to FIG. 4, a diagram of a Supersonic Lean Combustion Plasma Turbine High Bypass Fan 400 in accordance with another embodiment of the present invention is shown. Two or more Plasma Turbines 200 (200a and 200b as shown) are coupled to a bull gear 302 in a locked-train fashion. A high bypass fan 402 is attached to the shaft 304. Likewise, a small motor generator may be attached to the opposite end of the shaft for starting and inflight electrical needs. Once again the Plasma Turbine configuration allows for maximizing fuel efficiency while idling at the gate and taxing by operating only one Plasma Turbine attached to the bull gear. Prior to takeoff all Plasma Turbines are brought online to maximize thrust. After takeoff Plasma Turbines may be taken offline to maximize fuel efficiency during climbout and at cruise altitude and speed.

When the pilot is ready to transition to supersonic flight the turbine inlet valve is slowly closed while the combustor valve is opened. The high bypass fan may be feathered in order to reduce speed of the bull gear or to reduce drag. Likewise an inlet cowling may be used to close air flow to the high bypass fan. Air flow into the combustor is directly due to speed of the aircraft. This is accomplished with an additional three way valve (not shown) connected to the combustor tangential entry. Thus, the combination of the plasma arc torch 100 and the cyclone combustor coupled to a unique exhaust valve allows for a true plasma turbine scramjet that can be operated in a supersonic lean fuel combustion mode.

Figure 5:
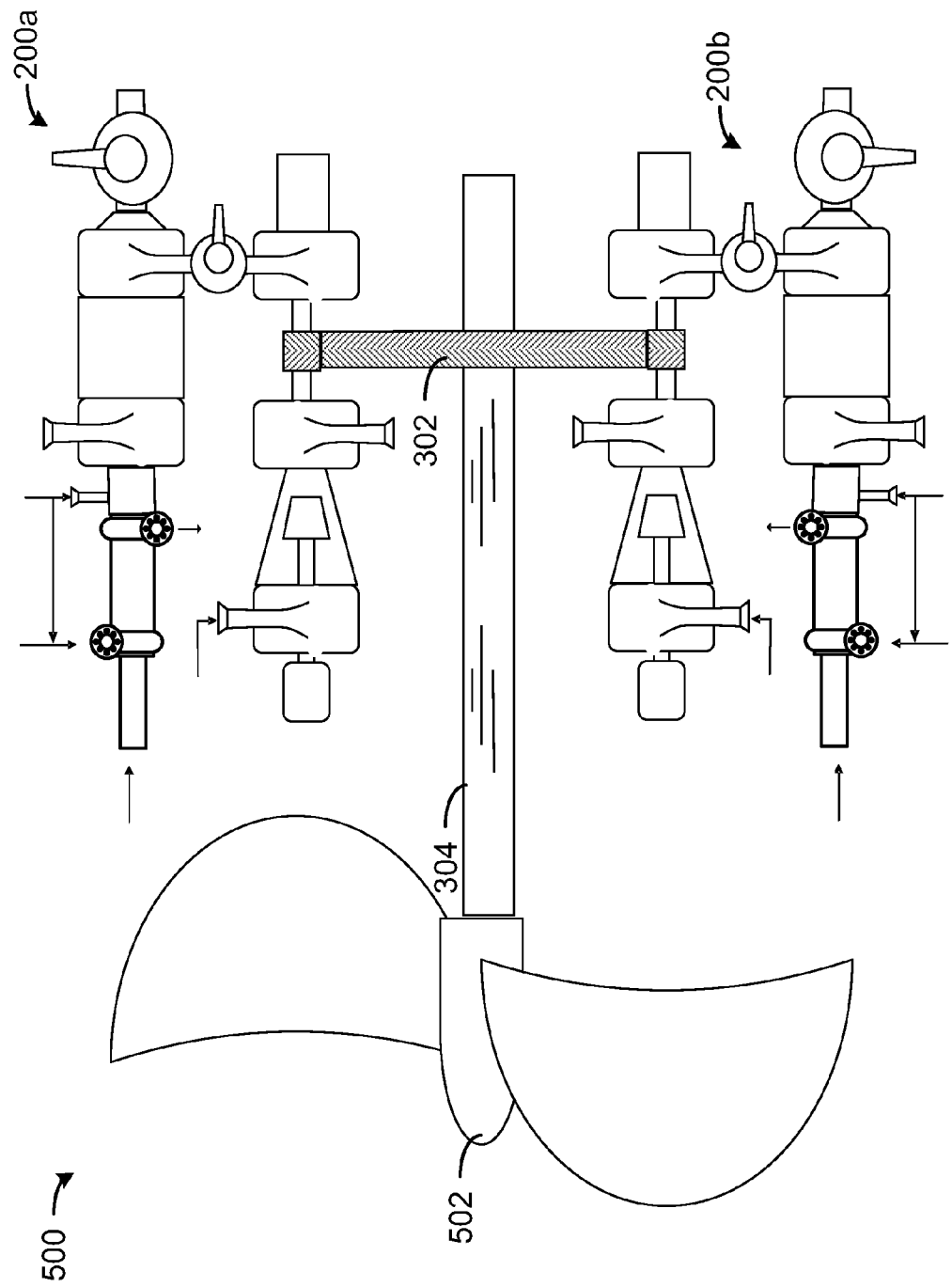
FIG. 5 is a diagram of a Supersonic Lean Combustion Plasma Turbine Propeller in accordance with another embodiment of the present invention.

Referring to FIG. 5, a diagram of a Supersonic Lean Combustion Plasma Turbine Propeller 500 in accordance with another embodiment of the present invention is shown, which is similar to the motor generator and high bypass fan, the system allows for a very unique marine turbine. In comparison, the US Navy's Spruance class destroyers were one of the first class of Naval ships to utilize high powered marinized aircraft turbines. Two GE LM-2500 Gas Turbine Engines were coupled to the port shaft via a bull gear and two GE LM-2500 Gas Turbine Engines were coupled to the starboard shaft via a bull gear. This gave the ship a total of 100,000 shaft horsepower. In order to operate in the most fuel efficient mode, only one engine was operated while the other engine was decoupled from the bull gear via a friction and spur gear type clutch. The other shaft was placed in a trail mode position and allowed to spin or rotate freely. If full power was needed the other 3 gas turbine engines required about 3 minutes to start in an emergency mode.

There were two major problems associated with the LM-2500 coupled to a bull gear. First, when starting from a dead in the water position, the engineers had to conduct a dead shaft pickup. This required engaging the clutch and placing the friction brake on which held the power turbine. The turbine was started and hot gases flowed across a non-moving power turbine section. The brake was released and the power turbine rotated thus turning the bull gear. The variable pitched propeller was usually placed at zero pitch.

Returning back to FIG. 5, the bull gear 302 with multiple Plasma Turbines 200 (200a and 200b are shown) may be attached to a drive shaft 304 that is connected to a propeller 502. However, this system can be greatly augmented with a motor generator (not shown) directly attached to the drive shaft 304. In fact, the propeller 502 can be eliminated and replaced with an all electric drive pod. Thus, FIG. 3 would be installed and simply would provide electrical power to the electric drive pod. Neither rotating a shaft for transportation and propulsion purposes nor rotating a large motor generator may be required from the Plasma Turbine System.

Figure 6:
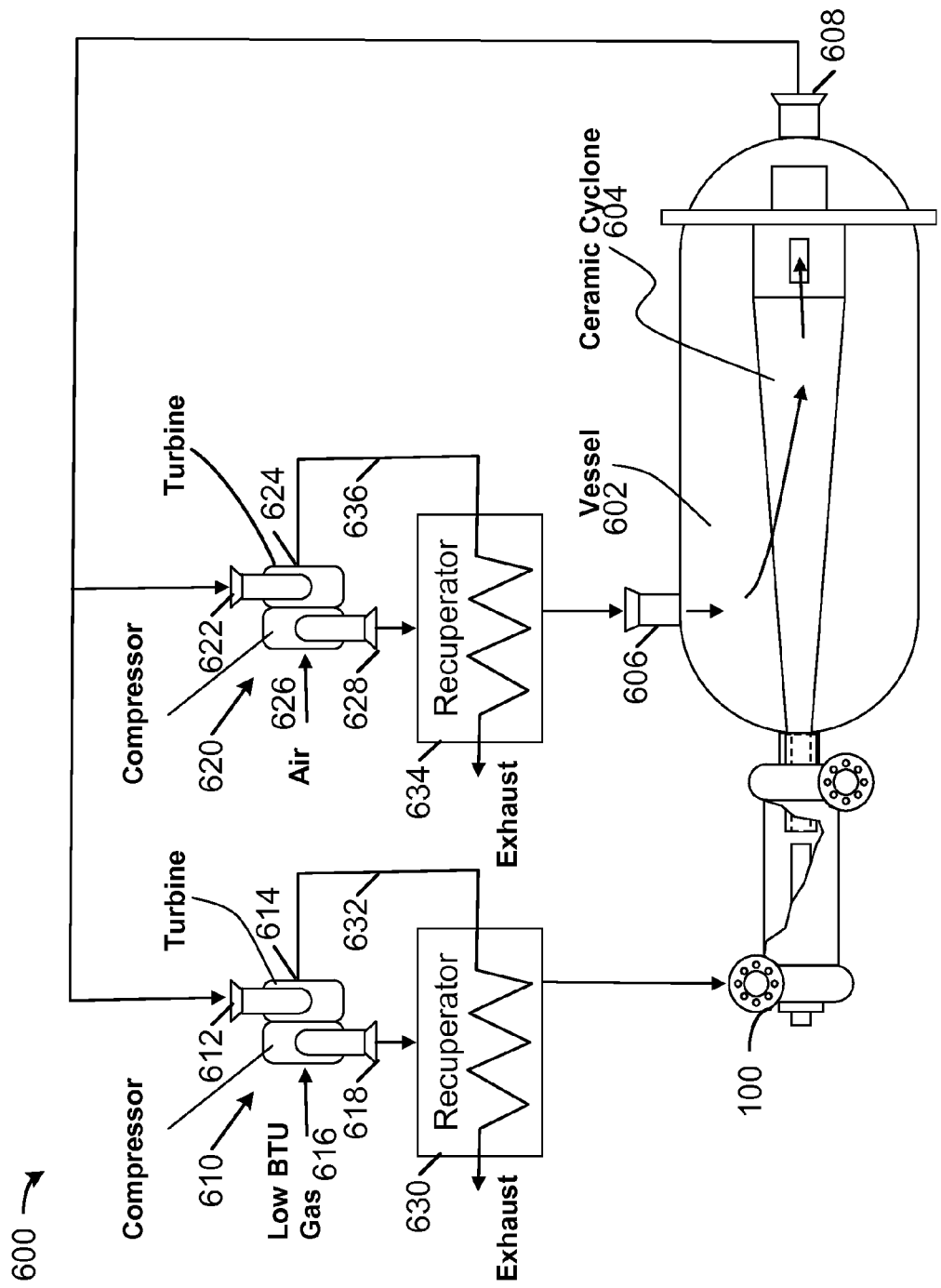
FIG. 6 is a diagram of a Plasma Turbine Thermal Oxidizer in accordance with another embodiment of the present invention.

Now referring to FIG. 6, a diagram of Plasma Turbine Thermal Oxidizer 600 in accordance with another embodiment of the present invention is shown. The plasma arc torch 100 is attached to a commonly available filter vessel 602 which houses a ceramic hydrocylone 604. Ceramic hydrocyclones 604 are available from CoorsTek and Natco.

More specifically, the vessel 602 has an air intake 606, a discharge exhaust 608 and houses at least one ceramic cyclone combustor 604 connected to the hollow electrode nozzle of the plasma arc torch 100. A first turbocharger 610 has a first turbine entry 612, a first turbine exit 614, a first compressor entry 616 and a first compressor exit 618. A second turbocharger 620 has a second turbine entry 622, a second turbine exit 624, a second compressor entry 626 and a second compressor exit 628. The first turbine entry 612 and the second turbine entry 622 are connected to the discharge exhaust 608 of the vessel 602. A first recuperator 630 is connected to the first turbine exit 614, the first compressor exit 618 and the tangential input of the plasma arc torch 100 such that a compressed fuel from the first compressor exit 618 is heated by a first exhaust 632 from the first turbine exit 614 and enters the tangential input of the plasma arc torch 100. A second recuperator 634 connected to the second turbine exit 624, the second compressor exit 628 and the air intake 606 of the vessel 602 such that a compressed air from the second compressor exit 628 is heated by a second exhaust 636 from the second turbine exit 624 and enters the air intake 606 of the vessel 602.

Many landfills as well as wastewater treatment plants produce a low BTU fuel referred to as biogas. Likewise, many industries produce a very low BTU offgas that must be thermally oxidized or incinerated. The plasma turbine thermal oxidizer achieves lean combustion by first gasifying the low BTU fuel in another low BTU fuel—syngas. However, since the syngas has a larger ignition range (LEL to UEL) it can be combusted at high flow rates without additional fuel.

The system is operated in the following mode. The plasma arc torch 100 is turned on to establish an arc. Water or steam may be flowed in the plasma arc torch 100 to form the whirl or vortex flow. Air is flowed into a compressor through a recuperator and into the vessel. The air surrounds and cools the ceramic cyclone combustor. The air enters into the ceramic hydrocylone tangentially then exits as a hot gas into the turbines. Once air flow is established the low BTU gas is flowed into a compressor then into a recuperator. The hot low BTU gas is flowed into the plasma arc torch 100 where it is steam reformed into syngas. Once again, the syngas plasma enters into apex valve of the ceramic cyclone combustor. The syngas is lean combusted and traverses to the turbine, recuperator and then exhausted for additional uses. In this system, the turbochargers may be installed with high speed alternators for providing electricity to operate the power supplies for the plasma arc torch 100.

This system is especially useful at wastewater treatment plants ("WWTPs"). Biogas is often produced from digesters. Likewise, all WWTPs use air to aerate wastewater. Since the Plasma Turbine Thermal Oxidizer operates in a lean fuel combustion mode, there is ample oxygen left within the exhaust gas. This gas can be used for aerating wastewater. Likewise, plasma arc torch 100 can be used to disinfect water while steam reforming biogas. In addition, biosolids can be gasified with the plasma arc torch 100 to eliminate disposal problems and costs.

Referring now to FIG. 7, a diagram of a Plasma Turbine Air Breathing & Steam Rocket with Recuperator 700 in accordance with another embodiment of the present invention is shown. The thermal oxidizer 600 of FIG. 6 can easily be converted into a rocket or process heater. A nozzle 702 and recuperator 704 are attached to the outlet 608 of the combustor 604. Air or an oxidant are flowed into the recuperator 704. The hot air or oxidant exits the recuperator 704 and enters into the vessel 602 and into the ceramic cyclone combustor 604. Fuel is pressurized via a turbocompressor 706 and enters into the plasma arc torch 100 where it is converted or cracked into syngas. The syngas plasma plume ejecting into the ceramic cyclone combustor 604 is controlled via a multi-position fuel recirculation valve 708. A portion of the fuel may flow into the nozzle 702 to increase thrust. In order to drive the turbines a portion of the hot exhaust gas is scavenged and flowed to the inlets of the fuel turbocompressor 706 and turbocharger 710. When used as an air breathing rocket, upon reaching altitudes where lean combustion cannot be sustained due a lack of oxygen molecules, in lieu of carrying an oxidant, the rocket would carry water. The water in pumped into the recuperator 704 to generate steam. The turbocharger 710 is valved such that it can pull a vacuum on the recuperator 704. The turbocharger 710 is then operated as a vapor compressor. The compressed steam is flowed in the vessel 602. The extremely hot syngas reacts with the steam in the ceramic cyclone combustor 604 for conversion to hydrogen and carbon dioxide via the water gas shift reaction. Since the water gas shift reaction is exothermic this will ensure that the steam remains in the vapor state. A small amount of liquid oxidizer may be added to combust the hydrogen.

Finally, the present invention provides a method for supersonic lean fuel combustion by creating an electric arc, generating a whirl flow to confine a plasma from the electric arc, generating a combustion air whirl flow, extracting a rotational energy from one or more hot gases, recuperating energy from the hot gases, and utilizing the electrical arc for converting fuel to syngas while confining the plasma to the vortex of the whirling combustion air in order to maintain and hold a flame for supersonic combustion while coupled to a means for extracting rotational energy from the hot lean combustion exhaust gas while recuperating energy for preheating the fuel and combustion air.

The foregoing description of the apparatus and methods of the invention in preferred and alternative embodiments and variations, and the foregoing examples of processes for which the invention may be beneficially used, are intended to be illustrative and not for purpose of limitation. The invention is susceptible to still further variations and alternative embodiments within the full scope of the invention, recited in the following claims.

What is claimed is:

1. A supersonic lean fuel combustion plasma arc turbine comprising:
    a plasma arc torch comprising:
        a cylindrical vessel having a first end and a second end,
        a tangential inlet connected to or proximate to the first end,
        a tangential outlet connected to or proximate to the second end,
        an electrode housing connected to the first end of the cylindrical vessel such that a first electrode is (a) aligned with a longitudinal axis of the cylindrical vessel, and (b) extends into the cylindrical vessel, a hollow electrode nozzle connected to the second end of the cylindrical vessel such that the center line of the hollow electrode nozzle is aligned with the longitudinal axis of the cylindrical vessel, and wherein the tangential inlet and the tangential outlet create a vortex within the cylindrical vessel, and the first electrode and the hollow electrode nozzle create a plasma that discharges through the hollow electrode nozzle;

a cyclone combustor connected to the hollow electrode nozzle of the plasma arc torch, wherein the cyclone combustor has a tangential entry, a tangential exit, and an exhaust outlet; and a turbocharger having a turbine connected to a compressor via a shaft, wherein an turbine entry is connected to the tangential exit of the cyclone combustor, a compressor exit is connected to the tangential entry of the cyclone combustor.

2. The supersonic lean fuel combustion plasma arc turbine as recited in claim 1, further comprising a first valve disposed between the tangential exit of the cyclone combustor and a the turbine entry.

3. The supersonic lean fuel combustion plasma arc turbine as recited in claim 1, further comprising compressor inlet valve connected to a compressor entry of the compressor.

4. The supersonic lean fuel combustion plasma arc turbine as recited in claim 3, wherein the compressor inlet valve comprises:
a volute with a tangential entry;
a cone-shaped reducer connected to the volute;
a linear actuator connected to the volute,
a cone-shaped stopper disposed within the cone-shaped reducer and operably connected to the linear actuator; and
a controller for connected to the linear actuator to adjust a gap between the cone-shaped stopper and the cone-shaped reducer to increase or decrease mass flow while maintaining whirl velocity to closely match compressor tip velocity.

5. The supersonic lean fuel combustion plasma arc turbine as recited in claim 1, further comprising:
a first stage recuperator connected to a discharge exhaust of the turbine;
a second stage recuperator connected to a discharge exhaust of the cyclone combuster; and
wherein the compressor exit is connected to the first stage recuperator such that a compressed air from the compressor is heated by the first stage recuperator and the second stage recuperator and enters the combustor via the tangential entry of the combustor.

6. The supersonic lean fuel combustion plasma arc turbine as recited in claim 5, further comprising a second valve disposed between the discharge exhaust of the cyclone combustor and the second stage recuperator.

7. The supersonic lean fuel combustion plasma arc turbine as recited in claim 1, further comprising a pinon gear attached to the shaft between the turbine and the compressor.

8. The supersonic lean fuel combustion plasma arc turbine as recited in claim 7, further comprising a bull gear and a drive shaft connected to the pinion gear.

9. The supersonic lean fuel combustion plasma arc turbine as recited in claim 8, further comprising a motor generator connected to the drive shaft.

10. The supersonic lean fuel combustion plasma arc turbine as recited in claim 8, further comprising a high bypass fan connected to the drive shaft.

11. The supersonic lean fuel combustion plasma arc turbine as recited in claim 8, further comprising a propeller connected to the drive shaft.

12. The supersonic lean fuel combustion plasma arc turbine as recited in claim 1, wherein the first electrode is hollow and a fuel is introduced into the hollow first electrode.

13. The supersonic lean fuel combustion plasma arc turbine as recited in claim 1, wherein a fuel is introduced into the tangential inlet of the plasma arc torch.

14. The supersonic lean fuel combustion plasma arc turbine as recited in claim 1, wherein a fuel is introduced into the plasma that discharges through the hollow electrode nozzle.

15. The supersonic lean fuel combustion plasma arc turbine as recited in claim 1, wherein a gas, a fluid or steam is introduced into the tangential inlet of the plasma arc torch.

16. A plasma turbine thermal oxidizer comprising:
a plasma arc torch comprising:
a cylindrical vessel having a first end and a second end,
a tangential inlet connected to or proximate to the first end,
a tangential outlet connected to or proximate to the second end,
an electrode housing connected to the first end of the cylindrical vessel such that a first electrode is (a) aligned with a longitudinal axis of the cylindrical vessel, and (b) extends into the cylindrical vessel,
a hollow electrode nozzle connected to the second end of the cylindrical vessel such that the center line of the hollow electrode nozzle is aligned with the longitudinal axis of the cylindrical vessel, and
wherein the tangential inlet and the tangential outlet create a vortex within the cylindrical vessel, and the first electrode and the hollow electrode nozzle create a plasma that discharges through the hollow electrode nozzle;
a vessel having an air intake, a discharge exhaust and housing at least one ceramic cyclone combustor connected to the hollow electrode nozzle;
a first turbocharger having a first turbine entry, a first turbine exit, a first compressor entry and a first compressor exit, wherein the first turbine entry is connected to the discharge exhaust of the vessel and the compressor exit is attached to the tangential input of the plasma arc torch; and
a second turbocharger having a second turbine entry, a second turbine exit, a second compressor entry and a second compressor exit, wherein the second turbine entry is connected to the discharge exhaust of the vessel and the second compressor exit connected to an air intake of the vessel housing the ceramic cyclone combustor(s).

17. The plasma turbine thermal oxidizer as recited in claim 16, further comprising:
a first recuperator connected to the first turbine exit, the first compressor exit and the tangential input of the plasma arc torch such that a compressed fuel from the first compressor exit is heated by a first exhaust from the first turbine exit and enters the tangential input of the plasma arc torch; and
a second recuperator connected to the second turbine exit, the second compressor exit and the air intake of the vessel such that a compressed air from the second compressor exit is heated by a second exhaust from the second turbine exit and enters the air intake of the vessel.

18. A plasma turbine air breathing and steam rocket comprising:
a plasma arc torch comprising:
a cylindrical vessel having a first end and a second end,
a tangential inlet connected to or proximate to the first end, a tangential outlet connected to or proximate to the second end, an electrode housing connected to the first end of the cylindrical vessel such that a first electrode is (a) aligned with a longitudinal axis of the cylindrical vessel, and (b) extends into the cylindrical vessel, a hollow electrode nozzle connected to the second end of the cylindrical vessel such that the center line of the hollow electrode nozzle is aligned with the longitudinal axis of the cylindrical vessel, and wherein the tangential inlet and the tangential outlet create a vortex within the cylindrical vessel, and the first electrode and the hollow electrode nozzle create a plasma that discharges through the hollow electrode nozzle;

a vessel housing at least one ceramic cyclone combustor connected to the hollow electrode nozzle;

a recuperator encapsulating an exhaust nozzle connected to a discharge exhaust to the vessel housing the ceramic cyclone combustor(s);

a first turbocompressor for compressing air, oxidant, or steam connected to the recuperator;

a second turbocompressor for pressuring fuel connected to the tangential input of the plasma arc torch;

a valve system connecting the tangential output of the plasma arc torch to the recuperator that converts the first turbocompressor into a vapor compressor pulling a suction on the recuperator while a water pump injects water into the recuperator and the compressed steam cools the ceramic cyclone combustor and enters into the ceramic cyclone combustor and shifts the syngas to hydrogen and carbon dioxide while injecting a secondary oxidant into the nozzle, thus allowing the rocket to transition from air breathing to steam propulsion;

a secondary oxidant injection system; and wherein the ceramic cyclone combustor is cooled with a preheated combustion air from the first turbocompressor which cooled the exhaust nozzle in the recuperator, an exhaust is scavenged to drive the first and second turbocompressors and a valve system means.

19. A method for supersonic lean fuel combustion comprising the steps of:

providing the apparatus of claim 1;

creating an electric arc;

generating a whirl flow to confine a plasma from the electric arc;

generating a combustion air whirl flow;

extracting a rotational energy from one or more hot gases;

recuperating energy from the hot gases; and utilizing the electrical arc for converting fuel to syngas while confining the plasma to the vortex of the whirling combustion air in order to maintain and hold a flame for supersonic combustion while coupled to a means for extracting rotational energy from the hot lean combustion exhaust gas while recuperating energy for preheating the fuel and combustion air.

* * * * *